United States Patent Office 2,963,477
Patented Dec. 6, 1960

2,963,477
HALOGEN PYRIDAZINES

Jean Druey, Riehen, Albrecht Hueni, Basel, Beat Heinrich Ringier, Riehen, and Alexander Staehelin, Basel, Switzerland, assignors to Ciba Pharmaceutical Products, Inc., Summit, N.J., a corporation of New Jersey No Drawing. Filed Jan. 23, 1957, Ser. No. 635,603
Claims priority, application Switzerland June 20, 1952
15 Claims. (Cl. 260—250)

This invention relates to the manufacture of 6-halogeno - 2 - aryl - 3 - oxo - 2:3 - dihydro - pyridazines. More particularly the invention concerns 6-halogeno-2-aryl-3-oxo-2:3-dihydro-pyridazines of the formulae

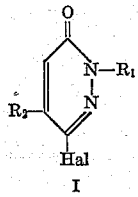

I and

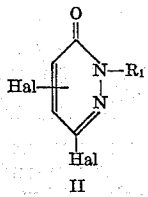

II wherein $R_1$ stands for an unsubstituted or lower alkyl-, nitro- or halogeno-substituted naphthyl or, preferably, phenyl radical, $R_2$ represents an amino group or hydrogen and Hal stands for chlorine or bromine. An amino group is preferably a lower alkylamino group, e.g. a dimethylamino-, diethylamino or dipropylamino-group, or an alkylene-amino group, such as pyrrolidino-, piperidino or morpholino-group.

The new pyridazines possess valuable pharmacological properties; thus the compounds of the Formula I exhibit an antipyretic and analgetic effect and are intended for use as medicaments, more particularly, as analgesics. The compounds of the Formula II possess valuable fungistatic and fungicidal properties, especially against *Microsporum audouini*, and can therefore be used as medicaments and disinfectants. The new compounds are also important intermediate products, particularly for the manufacture of the therapeutically applicable 6-amino-2 - aryl - 3 - oxo - 2:3 - dihydropyridazines described and claimed in our U.S. application Serial No. 362,678, filed June 18, 1953, and now United States Patent No. 2,798,869. Of especial importance are compounds of the above formulae, wherein $R_1$ stands for an unsubstituted or halogeno-substituted phenyl radical. Of the compounds of the Formula I 6-chloro-2-phenyl-3-oxo-2:3-dihydro-pyridazine and 6-chloro-5-dimethylamino-2-phenyl-3-oxo-2:3-dihydro-pyridazine are especially valuable; of the compounds of the Formula II the most valuable representatives are the 5:6-dichloro-2-phenyl-3-oxo-2:3-dihydro-pyridazine of the formula

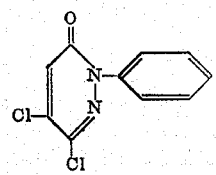

and more particularly the 4:6-dichloro-2-p-chlorophenyl-3-oxo-2:3-dihydro-pyridazine of the formula

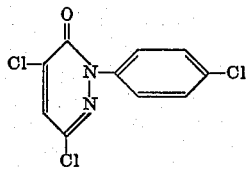

and the 5:6-dichloro-2-p-chlorophenyl-3-oxo-2:3-dihydropyridazine of the formula

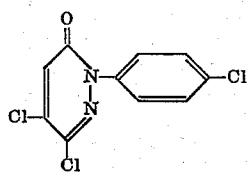

The new compounds are obtained when 6-hydroxy-2-aryl-3-oxo-2:3-dihydro-pyridazines of the formula

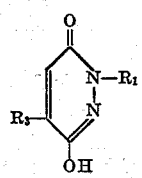

wherein $R_1$ has the meaning given above and $R_3$ stands for $R_2$ as indicated above or a chlorine or bromine atom, are treated with halogenating agents, preferably the halides of phosphoric acid such as phosphorus oxychloride, phosphorus trichloride, phosphorus pentachloride or phosphorus pentabromide. A chlorine or bromine atom can be introduced into the 4-position by halogenation with chlorine or a phosphorus pentahalogenide, such as phosphorus pentachloride. This substitution can be carried out in the same operation as the halogenation in 6-position or subsequently.

When by the instant process 6-halogeno-2-aryl-3-oxo-2:3-dihydro-pyridazines are obtained which in the position 5 contain a halogen atom, such halogen atom can be exchanged for an amino group, e.g. a dimethyl-amino, diethylamino or dipropylamino group or an alkyleneamino group, such as a pyrrolidino, piperidino or morpholino group by reaction with the corresponding amine.

The reactions set forth above can be carried out in the presence or absence of diluents or catalysts in open vessels or in closed vessels under pressure. The operation is preferably conducted at elevated temperature.

In a specific and preferred embodiment of the invention 6 - hydroxy - 2 - (p - chlorophenyl) - 3 - oxo - 2,3-dihydro-pyridazine is boiled with phosphorus oxychloride and then with a mixture of phosphorus oxychloride and phosphorus pentachloride, whereby 4,6-dichloro-2-p-(chlorophenyl) - 3 - oxo - 2:3 - dihydro - pyridazine is obtained. It is distinguished by its fungistatic and fungicidal properties.

The 2-aryl-6-hydroxy-pyridazone-(3) compounds used as starting materials can, in general, be prepared by condensing the appropriate aryl hydrazine with maleic anhydride, or substituted maleic anhydrides, e.g. chloro- or bromomaleic anhydride and, if desired, exchange of a halogen atom in 5-position with an amino group.

This is a continuation-in-part-application of our copending application Serial No. 362,684, filed June 18, 1953, (now abandoned).

The following examples illustrate the invention, the relation between parts by weight and parts by volume being the same as that between the gram and the cubic centimeter.

Example 1

100 parts by weight of 6-hydroxy-2-phenyl-3-oxo-2:3-dihydro-pyridazine are heated for one hour on the boiling water bath with 750 parts by volume of phosphorus oxychloride, the solution carefully poured with stirring upon 5500 parts by weight of ice and after standing for one hour in the cold the precipitate formed filtered with suction. It is washed with water and recrystallized from water. The resulting 6-chloro-2-phenyl-3-oxo-2:3-dihydro-pyridazine melts at 116–118° C.

The 6-hydroxy-2-phenyl-3-oxo-2:3-dihydro-pyridazine used as starting material can be prepared in the following manner:

235 parts by weight of maleic acid anhydride are dissolved in 2000 parts by volume of glacial acetic acid and boiled under reflux for three hours with a solution of 270 parts by weight of phenyl hydrazine in 500 parts by volume of glacial acetic acid. The hot solution is then poured into 700 parts by volume of water with stirring, in which operation crystallization takes place. The cooled mixture is filtered with suction, the residue washed with water, dissolved in N-sodium carbonate solution for purification and, after filtration, reprecipitated with 2 N-hydrochloric acid. The precipitate is filtered with suction, washed with water and dried. The 6-hydroxy-2-phenyl-3-oxo-2:3-dihydro-pyridazine thus obtained melts at 272–274° C.

Example 2

49 parts by weight of 6-hydroxy-2-(p-chlorophenyl)-3-oxo-2:3-dihydro-pyridazine are heated for one hour on the boiling water bath with 300 parts by volume of phosphorus oxychloride. The solution is carefully poured on ice, with stirring, and after standing for some time in the cold, the precipitate formed filtered with suction, washed with water and dried. The resulting 6-chloro-2-(p-chlorophenyl)-3-oxo-2:3-dihydro-pyridazine of the formula

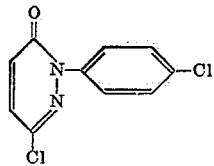

after recrystallization from a mixture of benzene and petrol ether melts at 138–140° C.

The 6-hydroxy-2-(p-chlorophenyl)-3-oxo-2:3-dihydro-pyridazine used as starting material can be prepared as follows:

66 parts by weight of p-chlorophenyl hydrazine in 122 parts by volume of glacial acetic acid are added to a solution of 76 parts by weight of maleic acid anhydride in 670 parts by volume of glacial acetic acid and the mixture heated to boiling for three hours under reflux. 240 parts by volume of water are added to the hot solution and crystallization is allowed to proceed while cooling. The crystallisate is filtered with suction, washed with water and dried. The resulting 6-hydroxy-2-(p-chlorophenyl)-3-oxo-2:3-dihydro-pyridazine melts at 280–282° C.

Example 3

5 parts by weight of 6-hydroxy-2-phenyl-3-oxo-2:3-dihydro-pyridazine are mixed with 12 parts by weight of phosphorus pentabromide and the mixture heated in an oil bath for three hours to 125–130° C. The reaction mixture is poured into 50 parts by volume of water, as a result of which the excess of phosphorus pentabromide is decomposed. After 15 hours' standing the whole is filtered with suction and the grey-brown product obtained washed with water and dried under vacuum. For purification it is dissolved in hot benzene. The solution is treated with petrol ether until a flocculent secondary product is precipitated and from the benzene-petrol ether solution, after filtration and purification with animal charcoal, by further addition of petrol ether the 6-bromo-2-phenyl-3-oxo-2:3-dihydro-pyridazine of the formula

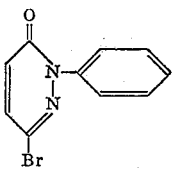

caused to crystallize. It melts at 122–124° C.

Example 4

85 parts by weight of 6-hydroxy-5-chloro-2-phenyl-3-oxo-2:3-dihydropyridazine are heated for one hour to 100° C. with 680 parts by volume of phosphorus oxychloride. The solution is decomposed with ice-cold dilute caustic soda solution and extracted with ether. After drying over potassium carbonate, the ether is evaporated and the residue recrystallized from cyclohexane. The resulting 5:6-dichloro-2-phenyl-3-oxo-2:3-dihydro-pyridazine of the formula

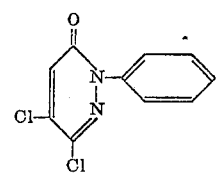

melts at 138° C.

The 6-hydroxy-5-chloro-2-phenyl-3-oxo-2:3-dihydro-pyridazine used as starting material can be prepared in the following manner.

400 parts by weight of chloromaleic acid anhydride are boiled for three hours under reflux with 311 parts by volume of phenyl hydrazine and 2200 parts by volume of glacial acetic acid. After 15 hours' standing at 20° C., the precipitate is filtered off and washed with glacial acetic acid. It is purified by dissolving in dilute caustic soda solution, filtering and precipitating with dilute hydrochloric acid and crystallized from glacial acetic acid. The 6-hydroxy-5-chloro-2-phenyl-3-oxo-2:3-dihydro-pyridazine thus obtained melts with decomposition at 270° C.

Example 5

6.9 parts by weight of 6-hydroxy-2-naphthyl-(2')-3-oxo-2:3-dihydro-pyridazine are heated for one hour on the water bath at 95° C. in 15 parts by volume of phosphorus oxychloride whereby solution takes place. The solution is then carefully poured in to water, the temperature being maintained at 40–50° C. by addition of ice. The whole is then allowed to stand and after some time the light grey residue is filtered with suction. The resulting 6-chloro-2-naphthyl(2')-3-oxo-2:3-dihydro-pyridazine of the formula

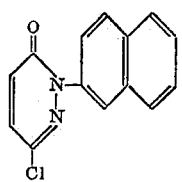

crystallizes from alcohol in long white needles which melt at 155–156° C.

The 6-hydroxy-2-naphthyl-(2')-3-oxo-2:3-dihydro-pyridazine used as starting material can be obtained in the following manner:

10.3 parts by weight of β-naphthylhydrazine are dissolved in 50 parts by volume of hot glacial acetic acid and treated with a solution of 6.4 parts by weight of maleic anhydride in 25 parts by volume of glacial acetic acid. The mixture is heated for one hour with reflux cooling, as a result of which solution at first takes place. After some time crystallization sets in. The whole is allowed to cool and the yellow-white precipitate is filtered with suction. The resulting 6-hydroxy-2-naphthyl-(2')-3-oxo-2:3-dihydro-pyridazine melts at 268–270° C.

*Example 6*

8.2 parts by weight of 6-hydroxy-2-naphthyl-(1')-3-oxo-2:3-dihydropyridazine and 20 parts by volume of phosphorus oxychloride are heated for one hour on the boiling water bath. The solution is poured into 40 parts by volume of lukewarm water (40–50° C.), the temperature being maintained at 40–50° C. by the addition of ice. A brown resin is produced which slowly disintegrates. The brown residue is filtered with suction and boiled with water and the solution filtered and, for crystallization, allowed to stand for several hours.

The white product resulting constitutes the 6-chloro-2-naphthyl-(1')-3-oxo-2:3-dihydro-pyridazine of the formula

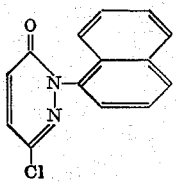

It melts at 126–128° C.

The 6-hydroxy-2-naphthyl-(1')-3-oxo-2:3-dihydro-pyridazine used as starting material can be prepared in the following manner:

16.4 parts by weight of α-naphthylhydrazine are dissolved in 80 parts by weight of glacial acetic acid and a solution of 10.4 parts by weight of maleic acid anhydride in 40 parts by volume of glacial acetic acid then added. The mixture is boiled under reflux for three hours and then, after cooling, poured into 40 parts by volume of water with stirring, whereby a yellowish product crystallises. The resulting 6-hydroxy-2-naphthyl-(1')-3-oxo-2:3-dihydro-pyridazine melts at 283–285° C. (decomposition).

*Example 7*

88 parts by weight of 6-hydroxy-2-(p-tolyl)-3-oxo-2:3-dihydro-pyridazine are heated for one hour to 100° C. with 600 parts by volume of phosphorus oxychloride. The excess of phosphorus oxychloride is decomposed with dilute ice-cold caustic soda solution and the mixture extracted with ether. The ether solution is dried over potassium carbonate, evaporated to dryness and the residue recrystallized from methanol. The resulting 6-chloro-2-(p-tolyl)-3-oxo-2:3-dihydro-pyridazine of the formula

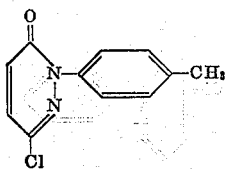

melts at 108–109° C.

The 6-hydroxy-compound used as starting material may be prepared as follows:

51 parts by weight of p-tolylhydrazine are boiled for two hours under reflux with 41 parts by weight of maleic anhydride in 400 parts by volume of glacial acetic acid. The solution is then treated with 200 parts by volume of water and the whole allowed to stand for 15 hours, whereby crystallization sets in. The product is filtered and the residue, for purification, dissolved in dilute caustic soda solution and reprecipitated with hydrochloric acid. The precipitate is then recrystallized from glacial acetic acid. The resulting 6-hydroxy-2-(p-tolyl)-3-oxo-2:3-dihydro-pyridazine melts at 242–244° C.

*Example 8*

10 parts by weight of 6-hydroxy-2-(p-nitrophenyl)-3-oxo-2:3-dihydro-pyridazine are heated for 2½ hours on a boiling water bath with 25 parts by volume of phosphorus oxychloride. The mixture is poured into water at 40–50°, this temperature being maintained by the addition of ice. The 6-chloro-2-(p-nitrophenyl)-3-oxo-2:3-dihydro-pyridazine of the formula

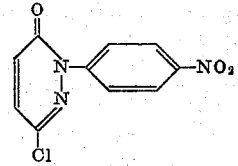

crystallises out. It may be recrystallized from ethyl acetate and melts then at 195–196° C.

The 6-hydroxy-2-(p-nitrophenyl)-3-oxo-2:3-dihydro-pyridazine used as starting material can be prepared in the following manner:

40 parts by weight of 6-hydroxy-2-phenyl-3-oxo-2:3-dihydro-pyridazine are stirred with 80 parts by volume of concentrated nitric acid. 80 parts by volume of concentrated sulfuric acid are added slowly at 0–5° C. within 60 minutes. The mixture is then stirred for 2 more hours at 0–10° C., 320 parts by volume of water then being added slowly whereby the temperature increases to 35° C. After cooling, the pale yellow nitro compound is filtered by suction. The crude product is dissolved in a sodium carbonate solution, filtered with animal charcoal, precipitated with 2-n hydrochloric acid, filtered by suction and dried. The resulting 6-hydroxy-2-(p-nitrophenyl)-3-oxo-2:3-dihydro-pyridazine melts at 289–291° C.

*Example 9*

14.25 parts by weight of the 5:6-dichloro-2-phenyl-3-oxo-2:3-dihydro-pyridazine of melting point 138° C. described in Example 4 are refluxed for 4 hours in 200 parts by volume of alcohol with 9 parts by weight of morpholine. On cooling, the reaction product crystallises. It is separated by filtration, washed with some aqueous alcohol and recrystallized from alcohol with some animal charcoal. The 6-chloro-5-morpholino-2-phenyl-3-oxo-2:3-dihydro-pyridazine of the formula

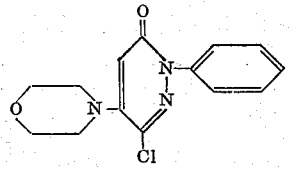

melts at 168–169° C. In a similar manner, starting from 5:6-dibromo-2-phenyl-3-oxo-2:3-dihydro-pyridazine described in Example 13 and morpholine, the 5-morpholino-6-bromo-2-phenyl-3-oxo-2:3-dihydro-pyridazine melting at 171.5–172.5° C. is obtained.

*Example 10*

16 parts by weight of the 5:6-dichloro-2-phenyl-3-oxo-2:3-dihydro-pyridazine of melting point 138° C. described in Example 4 are refluxed for 5 hours in 200 parts by volume of alcohol with 12 parts by weight of piperidine. On cooling, the reaction product crystallises. It is separated by filtration with suction, washed with dilute alcohol and recrystallised from alcohol with some animal charcoal. The resulting 6-chloro-5-piperidino-2-phenyl-3-oxo-2:3-dihydropyridazine of the formula

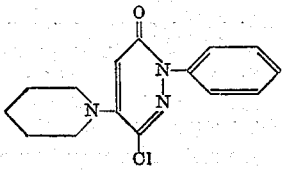

melts at 118.5–119.5° C.

Example 11

2.7 parts by weight of 6-oxy-5-morpholino-2-phenyl-3-oxo-2:3-dihydro-pyridazine are slowly heated to 50–100° C. with 40 parts by volume of phosphorus oxychloride, whereby all is dissolved. The temperature is maintained at 100° C. for one hour. After cooling, the mixture is poured onto ice and rendered alkaline by the addition of solid potassium carbonate. There follow extraction with ether, washing of the ethereal solution with water, drying and evaporation. The residue crystallises from alcohol in the form of fine needles melting at 167° C. and is identical with the 6-chloro-5-morpholino-2-phenyl-3-oxo-2:3-dihydropyridazine described in Example 9. The 6-oxy-5-morpholino-2-phenyl-3-oxo-2,3-dihydropyridazine used as starting material can be obtained as follows.

6-oxy-5-bromo-2-phenyl-3-oxo-2:3-dihydro - pyridazine (obtained by boiling 180 parts by weight of bromomaleic acid anhydride and 108 parts by weight of phenyl hydrazine in 400 parts by volume of glacial acetic acid for 2 hours, suction-filtering the product which crystallises on cooling, washing it with much ether, dissolving it in soda solution, filtering with animal charcoal and precipitating it with dilute hydrochloric acid; whose melting point is at 259–261° C.) is heated at 180° C. for 8 hours in a sealed tube with 19 parts by volume of morpholine and 300 parts by volume of alcohol. The crystalline crude product is separated by suction-filtering and recrystallized from alcohol with some animal charcoal. The resulting 6-oxy-5-morpholino-2-phenyl-3-oxo-2:3-dihydro-pyridazine of the formula

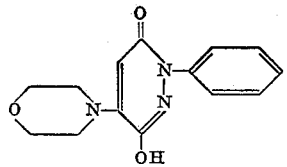

melts at 242.5–243° C.

In a similar manner the 6-oxy-5-piperidino-2-phenyl-3-oxo-2:3-dihydro-pyridazine can be chlorinated to form the 6 - chloro - 5 - piperidino-2-phenyl-3-oxo-2:3-dihydropyridazine described in Example 10. The 6-oxy-5-piperidino-2-phenyl-3-oxo-2:3-dihydro-pyridazine can be obtained as follows:

5.3 parts by weight of the above-mentioned 6-oxy-5-bromo-2-phenyl-3-oxo-2:3-dihydro-pyridazine are heated at 150–160° C. for 8 hours with 4 parts by weight of piperidine in 150 cc. of absolute alcohol in a sealed tube. The alcohol is distilled off, the residue dissolved in a large quantity of ethyl acetate, the solution washed with water and dilute hydrochloric acid, dried and evaporated. The residue is recrystallized from alcohol. The 6-oxy-5-piperidino-2-phenyl-3-oxo-2:3-dihydro-pyridazine thus obtained of the formula

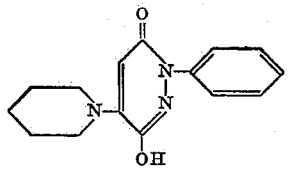

melts at 252–253° C.

Example 12

6.4 parts by weight of 2-phenyl-5:6-dichloro-3-oxo-2:3-dihydro-pyridazine described in Example 4 are heated for 6 hours to 170° C. with 20 parts by volume of alcoholic dimethylamino solution (of about 30 percent strength) in a sealed tube. The reaction mass is evaporated to dryness, the residue extracted by agitation with ether and water, the ethereal solution is dried over potash, the ether evaporated, and the residue recrystallized from a mixture of 2 volumes of benzene and 1 volume of isopropyl ether.

The resulting 6-chloro-5-dimethylamino-2-phenyl-pyridazone-(3) of the formula.

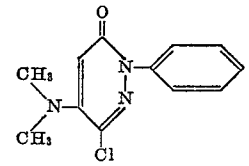

melts at 125–127° C. In a similar manner, starting from 2-phenyl-5:6-dibromo-3-oxo-2:3-dihydro-pyridazine and dimethylamine. The 2-phenyl-5-dimethylamino-6-bromo-3-oxo-2:3-dihydro-pyridazine - (3) melting at 124.5–125.5° is obtained.

Example 13

2.5 parts by weight of 2-phenyl-5-bromo-6-hydroxy-3-oxo-2:3-dihydro-pyridazine are triturated with 5 parts by weight of phosphorus pentabromide and heated at 140° C. until the melt solidifies again. The melt is then triturated with 1 N-sodium carbonate solution, taken up in methylene chloride, the methylene chloride solution is washed with water, dried and evaporated. By recrystallizing the residue twice from methanol there is obtained 2-phenyl-5:6-dibromo-3-oxo-2:3-dihydro-pyridazine of the formula

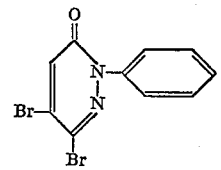

in the form of fine felted needles melting at 140–142° C.

Example 14

282 parts by weight of 2-phenyl-6-hydroxy-3-oxo-2:3-dihydro-pyridazine are heated to a gentle boil in 1000 parts by volume of phosphorus oxychloride with stirring until the whole is dissolved and the evolution of hydrochloric acid has ceased. 1000 parts by weight of phosphorus pentachloride are then added in 5 portions, the whole is heated to the boil again and boiled for 12 hours under reflux. Degradation is carried out with a mixture of ice and water while stirring, the temperature being maintained below 50° C. by the addition of ice. The reaction product is taken up in methylene chloride, the solution is washed with water and sodium carbonate solution, dried and, after distilling off the solvent, 2-phenyl-4:6-dichloro-3-oxo-2:3-dihydropyridazine of the formula

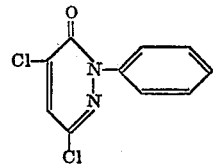

recrystallizes from methanol. It melts at 111–112° C.

Example 15

10 parts by weight of 6-hydroxy-5-chloro-2-(p-chlorophenyl)-3-oxo-2:3-dihydro-pyridazine are boiled under reflux for 3 hours in 50 parts by volume of phosphorus oxychloride. The excess phosphorus oxychloride is then distilled off in vacuo, the residue is mixed with water and agitated with methylene chloride. The methylene chloride solution is washed neutral with sodium hydrogen carbonate solution and water, dried, and the methylene chloride is distilled off. The residue is recrystallized from a mixture of acetone and methanol with charcoal treatment. There is obtained 5:6-dichloro-2-(p-chlorophenyl)-3-oxo-2:3-dihydro-pyridazine of the formula

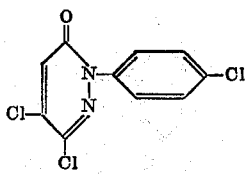

in the form of colorless, felted needles melting at 173—174° C.

The 6-hydroxy-5-chloro-2-(p-chlorophenyl)-3-oxo-2:3-dihydro-pyridazine used as starting material can be prepared as follows:

28.5 parts by weight of p-chlorophenyl-hydrazine dissolved in 120 parts by volume of glacial acetic acid are boiled under reflux for 2½ hours with 27 parts by weight of chloro-maleic acid anhydride. After cooling, the recrystallized product is suction-filtered and washed with ether. For the purpose of purification it is dissolved in dilute caustic soda solution, the solution is filtered with charcoal and acidified with dilute hydrochloric acid. The precipitate is suction-filtered, dissolved hot in glacial acetic acid and the resulting solution is concentrated until crystallization sets in. The resulting 6-hydroxy-5-chloro-2-(p-chlorophenyl)-3-oxo-2:3-dihydropyridazine forms colorless lamellae with a nacreous luster.

*Example 16*

119 parts by weight of 6-hydroxy-2-(p-chlorophenyl)-3-oxo-2:3-dihydro-pyridazine are heated at 100–110° C. for 1 hour with stirring with 330 parts by volume of phosphorus oxychloride. 330 parts by weight of phosphorus pentachloride are then added in portions and the mixture is boiled for 6 hours under reflux. The mixture is then introduced into water while stirring, the temperature being maintained at 65° C. by the addition of ice. The precipitated reaction product is suction-filtered, taken up in methylene chloride and the solution washed neutral with water. The residue which remains behind after distilling off the methylene chloride is recrystallized from methanol. There is obtained 4:6-dichloro - 2 - (p - chlorophenyl) - 3 - oxo - 2:3 - dihydropyridazine of the formula

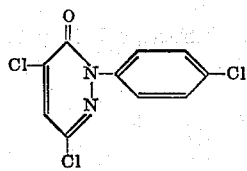

in the form of almost colorless, felted needless melting at 163–165° C.

The preparation of the 6-hydroxy-2-(p-chlorophenyl)-3-oxo-2:3-dihydro-pyridazine is described in Example 2.

What is claimed is:

1. 6-halogeno-2-aryl-3-oxo-2:3-dihydro-pyridazines of the formula

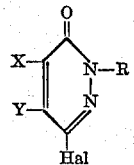

wherein Hal represents a member selected from the group consisting of chlorine and bromine, R stands for a member selected from the group consisting of an unsubstituted and a lower alkyl-, nitro-, chloro- and bromo-substituted phenyl and naphthyl radical, X stands for a member selected from the group consisting of hydrogen, chlorine and bromine and Y stands for a member selected from the group consisting of hydrogen, amino groups of the formula:

wherein each R is a member of the group consisting of hydrogen, alkyl and, when taken together, the substituents necessary to form a member of the group consisting of pyrrolidino, piperidino and morpholino, chlorine and bromine, at least one of said substituents X and Y being hydrogen.

2. 6-halogeno-2-aryl-3-oxo-2:3-dihydro-pyridazines of the formula

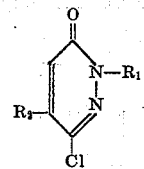

wherein $R_1$ represents a lower alkyl-substituted phenyl radical and $R_2$ stands for an amino group of the formula

wherein each R is a member of the group consisting of hydrogen, alkyl and when taken together, the substituents necessary to form a member of the group consisting of pyrrolidino, piperidino and morpholino groups.

3. 6-halogeno-2-aryl-3-oxo-2:3-dihydro-pyridazines of the formula

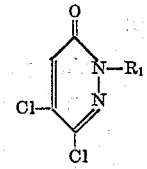

wherein $R_1$ represents a lower alkyl-substituted phenyl radical.

4. 6-halogeno-2-aryl-3-oxo-2:3-dihydro-pyridazines of the formula

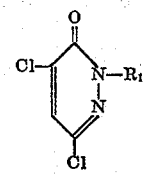

wherein $R_1$ represents a lower alkyl-substituted phenyl radical.

5. 6-halogeno-2-aryl-3-oxo-2:3-dihydro-pyridazines of the formula

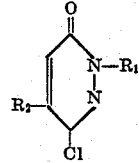

wherein $R_1$ represents a halogeno substituted phenyl radical and $R_2$ an amino group of the formula

wherein each R is a member of the group consisting of hydrogen, alkyl and when taken together, the substituents necessary to form a member of the group consisting of pyrrolidino, piperidino and morpholino groups.

6. 6-halogeno-2-aryl-3-oxo-2:3-dihydro-pyridazines of the formula

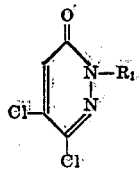

wherein $R_1$ represents a halogeno-substituted phenyl radical.

7. 6-halogeno-2-aryl-3-oxo-2:3-dihydro-pyridazines of the formula

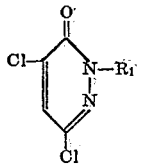

wherein $R_1$ represents a halogeno-substituted phenyl radical said halogeno substituent being a member of the class consisting of chloro and bromo.

8. 6-halogeno-2-aryl-3-oxo-2:3-dihydro-pyridazines of the formula

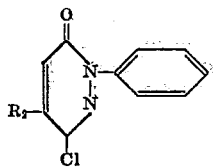

wherein $R_2$ stands for an amino group of the formula

wherein each R is a member of the group consisting of hydrogen, alkyl and when taken together, the substituents necessary to form a member of the group consisting of pyrrolidino, piperidino and morpholino groups.

9. 6-halogeno-2-aryl-3-oxo-2:3-dihydro-pyridazines of the formula

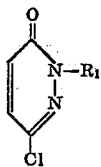

wherein $R_1$ represents a lower alkyl-substituted phenyl radical.

10. 6-halogeno-2-aryl-3-oxo-2:3-dihydro-pyridazines of the formula

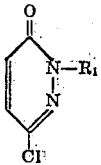

wherein $R_1$ stands for a halogeno-substituted phenyl radical.

11. 6-chloro-2-phenyl-3-oxo-2:3-dihydro-pyridazine.
12. 6 - chloro - 5 - dimethylamino - 2 - phenyl - 3 - oxo-2:3-dihydro-pyridazine.
13. 5:6 - dichloro - 2 - phenyl - 3 - oxo - 2:3 - dihydro-pyridazine.
14. 4:6 - dichloro - 2 - p - chlorophenyl - 3 - oxo - 2:3-dihydro-pyridazine.
15. 5:6 - dichloro - 2 - p - chlorophenyl - 3 - oxo - 2:3-dihydro-pyridazine.

References Cited in the file of this patent

UNITED STATES PATENTS

| | | |
|---|---|---|
| 2,628,181 | Mowry | Feb. 10, 1953 |
| 2,798,869 | Druey et al. | July 9, 1957 |

FOREIGN PATENTS

| | | |
|---|---|---|
| 164,389 | Australia | July 25, 1955 |
| 600,532 | Great Britain | Apr. 12, 1948 |

OTHER REFERENCES

Sonn et al.: Chem. Abstracts, vol. 29, p. 5845 (1935).
Gregory et al.: Chem. Abstracts, vol. 44, p. 3506 (1950).
Overend: Chem. Abstracts, vol. 41, p. 5577 (1944).